US011942066B2

(12) United States Patent
Yamate et al.

(10) Patent No.: US 11,942,066 B2
(45) Date of Patent: Mar. 26, 2024

(54) TRANSMITTER FOR MUSICAL INSTRUMENT, AND MODE SWITCHING METHOD THEREOF

(71) Applicant: Roland Corporation, Shizuoka (JP)

(72) Inventors: Hiroshi Yamate, Shizuoka (JP); Shinji Asakawa, Shizuoka (JP); Masato Ueno, Shizuoka (JP); Ryo Susami, Shizuoka (JP)

(73) Assignee: Roland Corporation, Shizuoka (JP)

( * ) Notice: Subject to any disclaimer, the term of this patent is extended or adjusted under 35 U.S.C. 154(b) by 932 days.

(21) Appl. No.: 16/960,319

(22) PCT Filed: Jan. 8, 2018

(86) PCT No.: PCT/JP2018/000138
§ 371 (c)(1),
(2) Date: Jul. 7, 2020

(87) PCT Pub. No.: WO2019/135291
PCT Pub. Date: Jul. 11, 2019

(65) Prior Publication Data
US 2021/0056942 A1 Feb. 25, 2021

(51) Int. Cl.
*G10H 1/00* (2006.01)
*G10H 1/34* (2006.01)
(Continued)

(52) U.S. Cl.
CPC ................. *G10H 1/34* (2013.01); *G10H 3/18* (2013.01); *G10H 2240/211* (2013.01)

(58) Field of Classification Search
CPC .. G10H 1/0083; G10H 2230/035; G10H 1/34; G10H 2240/211; G10H 2220/401; G10H 2240/321; G10H 3/18; H04B 1/02
See application file for complete search history.

(56) References Cited

U.S. PATENT DOCUMENTS 8,237,041 B1 * 8/2012 McCauley ........... G10H 1/0091 84/610
2016/0284184 A1 9/2016 Bean et al.

FOREIGN PATENT DOCUMENTS

CN 101727164 6/2010
CN 204482003 7/2015
(Continued)

OTHER PUBLICATIONS

Office Action of Korean Counterpart Application, with English translation thereof, dated Dec. 10, 2021, pp. 1-14.
(Continued)

*Primary Examiner* — Tuan Pham
(74) *Attorney, Agent, or Firm* — JCIPRNET

(57) ABSTRACT

Provided is a transmitter for musical instrument and a mode switching method thereof. A transmitter for musical instrument which is mounted on an electric guitar determines the electric guitar is in a not-in-use state when a continuation time in which a square sum of accelerations output from a three-axis acceleration sensor is smaller than a power-saving threshold value is longer than a power-saving transition time, and the transmitter transitions from a normal mode to an energy-saving mode. On the other hand, when the accelerations in the energy-saving mode becomes equal to or greater than a release threshold value from a state of being smaller than the release threshold value or becomes equal to or smaller than the release threshold value from a state of being greater than the release threshold value, the electric guitar is returned from the energy-saving mode to the normal mode.

6 Claims, 5 Drawing Sheets

(51) Int. Cl.
*G10H 1/46* (2006.01)
*G10H 3/18* (2006.01)

(56) References Cited

FOREIGN PATENT DOCUMENTS

| | | |
|---|---|---|
| CN | 105247887 | 1/2016 |
| CN | 107181990 | 9/2017 |
| JP | H0997070 | 4/1997 |
| JP | H09269786 | 10/1997 |
| JP | 2000352980 | 12/2000 |
| JP | 2007085950 | 4/2007 |
| JP | 2009063563 | 3/2009 |
| JP | 2013122669 | 6/2013 |
| JP | 2015052653 | 3/2015 |
| JP | 2016194721 | 11/2016 |
| TW | 201118662 | 6/2011 |
| WO | 2015085092 | 6/2015 |
| WO | 2017073138 | 5/2017 |
| WO | 2017127787 | 7/2017 |
| WO | 2017195390 | 11/2017 |

OTHER PUBLICATIONS

"International Search Report (Form PCT/ISA/210) of PCT/JP2018/000138," dated Feb. 13, 2018, with English translation thereof, pp. 1-4.
"Search Report of Europe Counterpart Application", dated Jul. 12, 2021, p. 1-p. 10.
"Office Action of Japan Counterpart Application", dated Aug. 3, 2021, with English translation thereof, p. 1-p. 10.
"Office Action of Japan Counterpart Application", dated Oct. 26, 2021, with English translation thereof, p. 1-p. 10.
"Office Action of Japan Counterpart Application", dated Mar. 15, 2022, with English translation thereof, p. 1-p. 7.
"Office Action of China Counterpart Application", dated Aug. 16, 2023, with English translation thereof, p. 1-p. 27.

* cited by examiner (a)

(b)

(a)

(b)

TRANSMITTER FOR MUSICAL INSTRUMENT, AND MODE SWITCHING METHOD THEREOF

CROSS-REFERENCE TO RELATED APPLICATION

This application is a 371 application of the international PCT application serial no. PCT/JP2018/000138, filed on Jan. 8, 2018. The entirety of the above-mentioned patent application is hereby incorporated by reference herein and made a part of this specification.

BACKGROUND OF THE INVENTION

Technical Field

The present invention relates to a transmitter for musical instrument and a mode switching method thereof.

Related Art

As recited in patent literature 1, a transmitter for musical instrument (transmitter) 15 is mounted on a portable electronic musical instrument such as an electric guitar 14, a shoulder-mounted electronic keyboard, an electronic saxophone, or the like, and transmits a sound signal emitted by the electronic musical instrument to a receiver 16. When the receiver 16 receives the sound signal from the transmitter 15, the receiver 16 amplifies the sound signal by an amplifier and outputs the sound to a speaker 12. Thereby, playing of the portable electronic musical instrument can be enjoyed.

LITERATURE OF RELATED ART

[Patent Literature]

[Patent literature 1] Japanese Patent Laid-Open No. 2015-052653

SUMMARY

Problems to be Solved

Because the transmitter is mainly driven by a battery, the transmitter is switched to an energy-saving mode to save battery consumption when the electronic musical instrument is not in use. However, because the not-in-use state of the electronic musical instrument is determined by the sound signal, when the volume of the electronic musical instrument is reduced, the not-in-use state is difficult to determine. In addition, in the case of an electric guitar, the output of the pickup has a high impedance, and thus power hum and fluorescent lamp noise are received easily, and the sound signal may be detected due to resonance of an open string or the like even when there is no operation. Thus, in this case, the not-in-use state is also difficult to determine according to the sound signal.

The present invention is completed in view of solving the above problems and aims to provide a transmitter for musical instrument which accurately detects the not-in-use state of a mounted electronic musical instrument to switch the mode and a mode switching method thereof.

Means to Solve Problems

In order to achieve this object, the transmitter for musical instrument of the present invention transmits a sound signal emitted from a musical instrument to the outside using a battery arranged inside a main body. The transmitter for musical instrument has a first mode and a second mode in which power consumption of the battery is smaller than the first mode, and includes a detection part for detecting an acceleration of the main body and a switching part for transitioning to the second mode when a detection value of the detection part shows a value within a predetermined range during a predetermined time in the first mode.

In addition, the transmitter for musical instrument of the present invention includes a release part for releasing the second mode to transition to the first mode when the detection value of the detection part exceeds a release threshold value in the second mode. Here, the case of exceeding the release threshold value refers to any one of or both of a case in which the detection value becomes equal to or greater than the release threshold value from a state of being smaller than the release threshold value and a case in which the detection value becomes equal to or smaller than the release threshold value from a state of being greater than the release threshold value.

Furthermore, a mode switching method of the present invention performs, in a transmitter for musical instrument which transmits a sound signal emitted from a musical instrument to the outside using a battery arranged inside a main body, switching from a first mode to a second mode in which power consumption of the battery is smaller than the first mode. The mode switching method includes a detection step for detecting an acceleration of the main body in the first mode and a switching step for transitioning to the second mode when the detection value detected by the detection step shows a value within a predetermined range during a predetermined time.

In addition, the mode switching method of the present invention performs switching from a second mode to a first mode in which power consumption of the battery is greater than the second mode, and includes a detection step for detecting an acceleration of the main body in the second mode, and a release step for releasing the second mode to transition to the first mode when the detection value of the detection step exceeds a release threshold value. Here, the case of exceeding the release threshold value refers to any one of or both of a case in which the detection value becomes equal to or greater than the release threshold value from a state of being smaller than the release threshold value and a case in which the detection value becomes equal to or smaller than the release threshold value from a state of being greater than the release threshold value.

BRIEF DESCRIPTION OF THE DRAWINGS (a) of FIG. 1 is a diagram showing an in-use state of a transmitter for musical instrument in an embodiment, and (b) of FIG. 1 is a perspective view of the transmitter for musical instrument.

Figure 5:
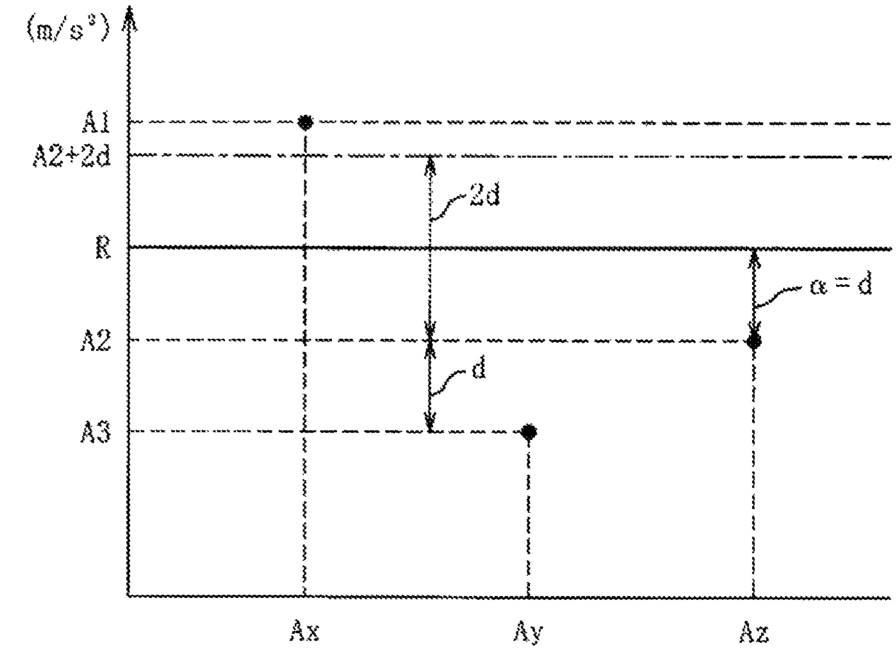
Figure 5:
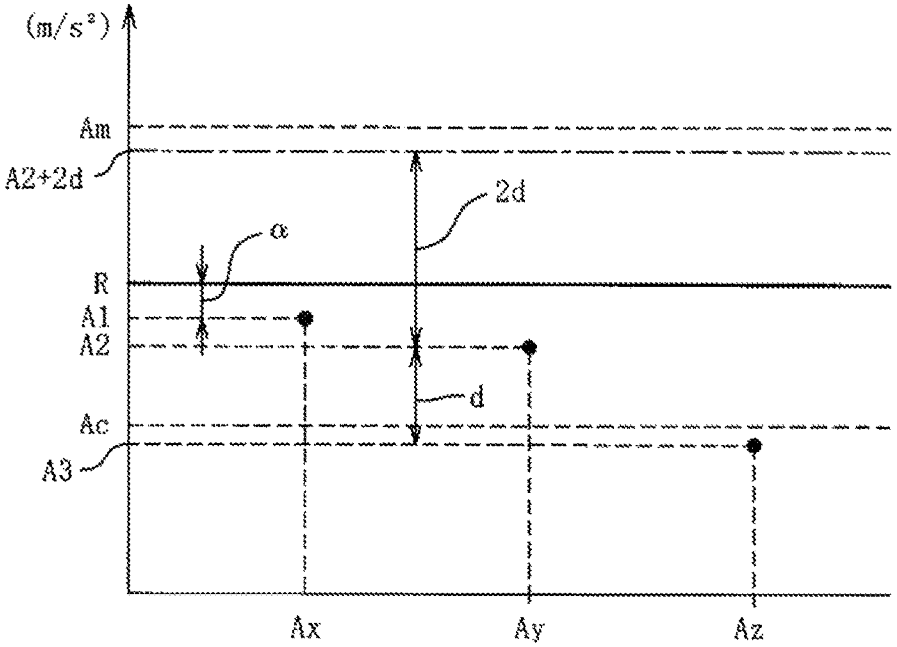

(a) of FIG. 5 is a diagram showing a calculation method of a release threshold value when deviation between accelerations of three axes is great, and (b) of FIG. 5 is a diagram showing a calculation method of a release threshold value when deviation between three-axis accelerations is small.

DESCRIPTION OF THE EMBODIMENTS

Figure 1:
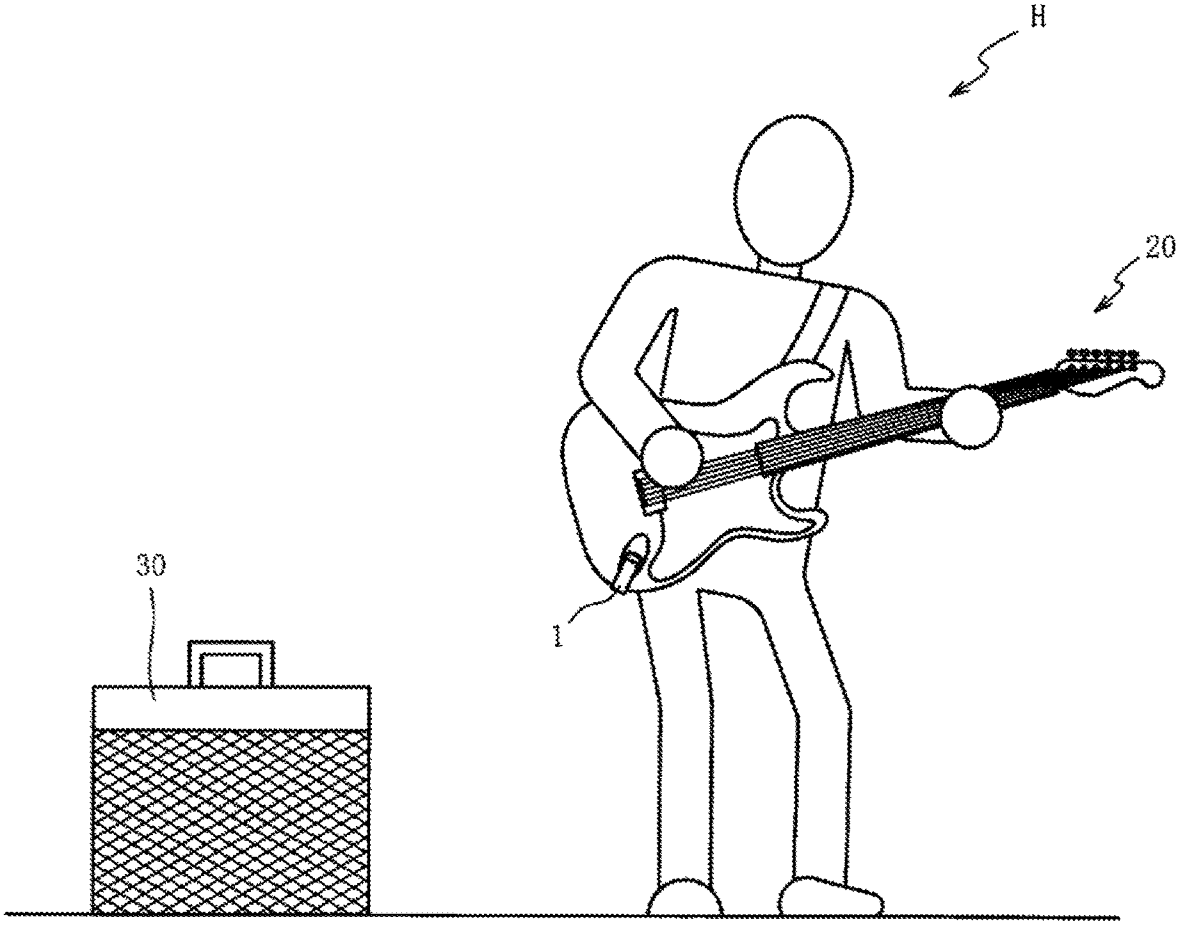
Figure 1:
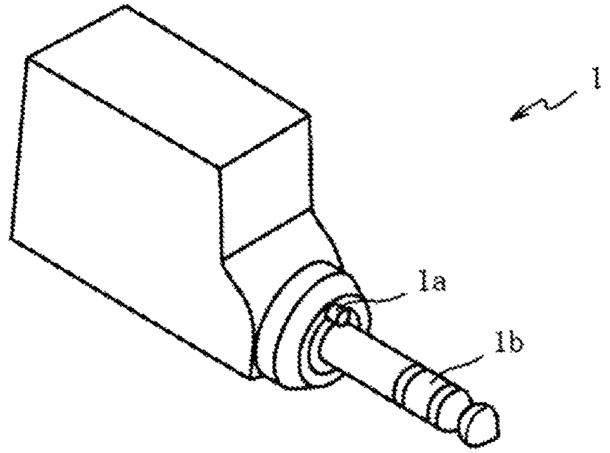

Hereinafter, preferred embodiments are described with reference to the accompanying drawings. (a) of FIG. 1 is a diagram showing an in-use state of a transmitter for musical instrument (hereinafter abbreviated as "transmitter") 1, and (b) of FIG. 1 is a perspective view of the transmitter 1. The transmitter 1 is mounted to a portable electronic musical instrument such as a shoulder-mounted electric guitar 20 or the like, and is configured for transmitting, by wireless communication, a sound signal input from the electric guitar 20 to an amplification device 30 outputting a musical sound. As shown in (b) of FIG. 1, the transmitter 1 is provided with a power button 1*a* for switching on/off of a power of the transmitter 1 and an input terminal 1*b* which is connected to an external device such as the electric guitar 20 or the like and inputs a signal such as the sound signal or the like from the external device.

The electric guitar 20 has a plurality of strings and an electromagnetic pickup (not shown) connected to the strings and converts vibration of the strings to an electric signal (a sound signal) and outputs the sound signal by the electromagnetic pickup.

The transmitter 1 and the electric guitar 20 are connected by the input terminal 1*b* of the transmitter 1 and a jack (not shown) of the electric guitar 20. The sound signal output from the electric guitar 20 is input to the transmitter 1 via the input terminal 1*b* of the transmitter 1 and is transmitted to the amplification device 30 by wireless communication, and a musical sound is output by the amplification device 30. Thereby, a user H can enjoy playing.

Figure 2:
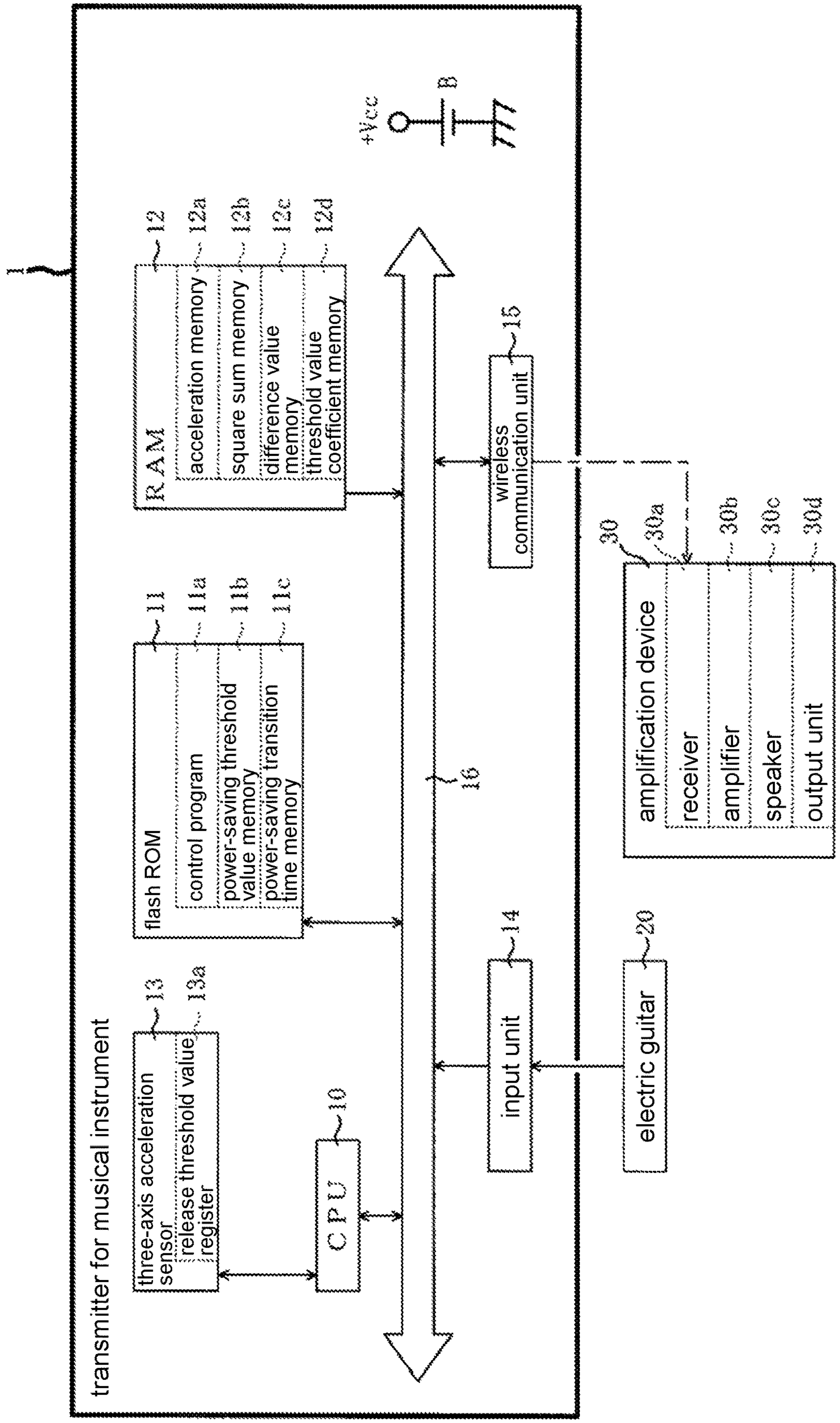
FIG. 2 is a block diagram showing an electric configuration of the transmitter for musical instrument.

Next, an electric configuration of the transmitter 1 is described with reference to FIG. 2. FIG. 2 is a block diagram showing the electric configuration of the transmitter 1. The transmitter 1 is driven by a rechargeable battery B. That is, a drive voltage is supplied from the battery B to each unit of the transmitter 1 including a CPU (central processing unit) 10, and the transmitter 1 is driven. The CPU 10 is an arithmetic device (a control unit) which controls each unit and is connected with a three-axis acceleration sensor (for example, LIS2DH12 manufactured by STMicroelectronics) 13. The three-axis acceleration sensor 13 is an acceleration sensor which can detect accelerations Ax to Az in three directions of X-axis, Y-axis, and Z-axis, gravity, vibration, motion and impact, and has a release threshold value register 13*a*.

Figure 3:
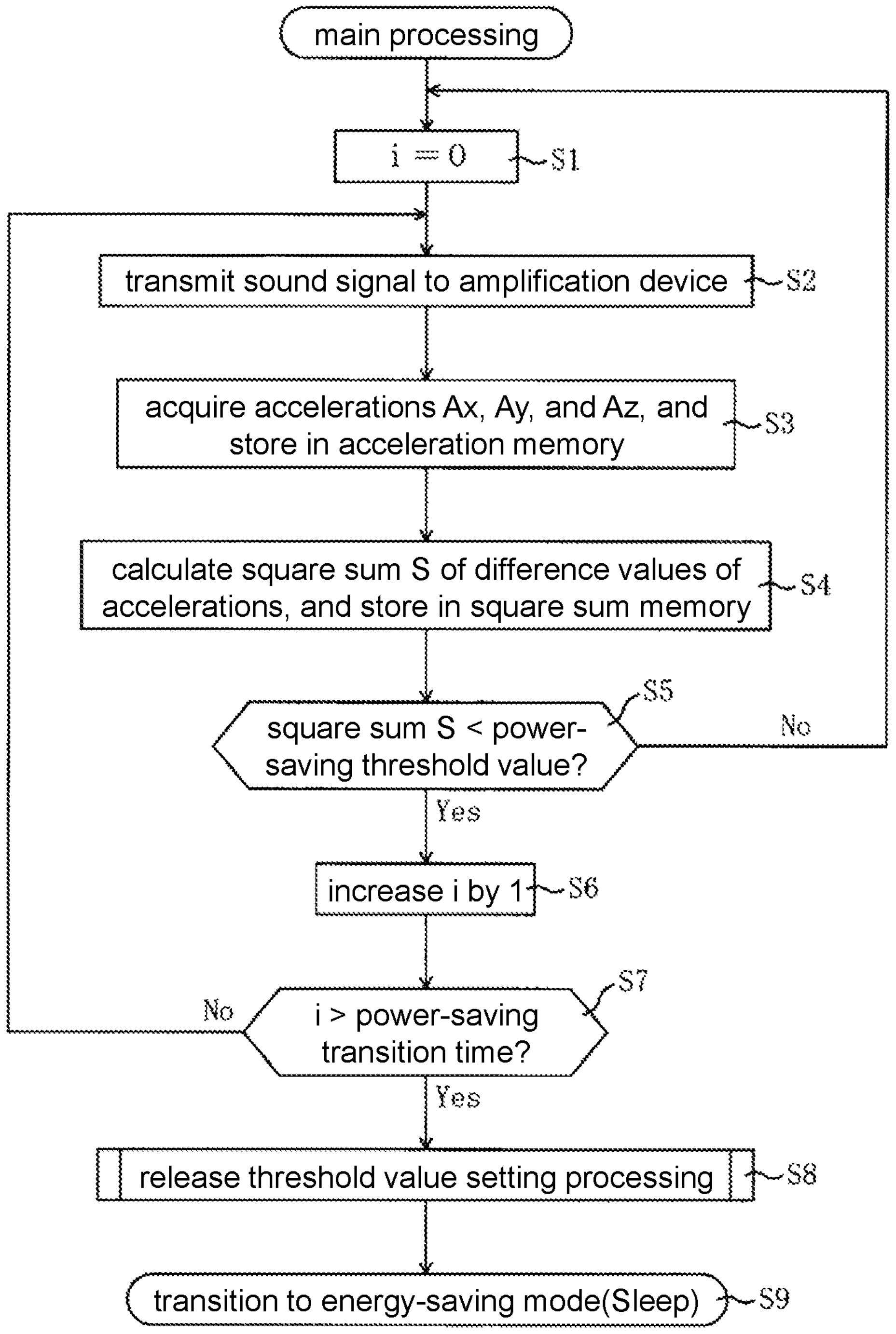
FIG. 3 is a flowchart of main processing.

The release threshold value register 13*a* is a register which stores a release threshold value R for releasing an energy-saving mode of the transmitter 1 (a second mode which is a sleep state of the CPU 10) and returning to a normal mode (a first mode). When any one of the accelerations Ax to Az detected by the three-axis acceleration sensor 13 becomes equal to or greater than the release threshold value R from a state of being smaller than the release threshold value R or becomes equal to or smaller than the release threshold value R from a state of being greater than the release threshold value R, an interrupt signal is output from the three-axis acceleration sensor 13 to the CPU 10. When the interrupt signal is input, the CPU 10 returns from the sleep state and starts to execute main processing (FIG. 3). That is, the energy-saving mode is released.

A flash ROM (read only memory) 11 is a rewritable nonvolatile memory, stores a control program 11*a* for the main processing (FIG. 3) and the like, and has a power-saving threshold value memory 11*b* and a power-saving transition time memory 11*c*. The power-saving threshold value memory 11*b* is a memory for storing a power-saving threshold value compared with a square sum S of difference values between previous values and current values of sampled values of each of the accelerations Ax to Az which are output values of the three-axis acceleration sensor 13 (hereinafter abbreviated as "the square sum S of the difference values of the accelerations Ax to Az") to determine a stationary state of the transmitter 1 in the normal mode.

The power-saving threshold value is set corresponding to the square sum S of the difference values of the accelerations Ax to Az detected in the stationary state of the transmitter 1. That is, in the stationary state, because accelerations other than the gravity acceleration are not detected, the accelerations Ax to Az detected by the transmitter 1 are acceleration vectors obtained by decomposing the gravity acceleration in X-axis to Z-axis directions respectively. Thus, in the embodiment, "20" is set as the power-saving threshold value based on the accelerations Ax to Az detected in the stationary state.

The power-saving transition time memory 11*c* is a memory in which a power-saving transition time which is a time condition for transitioning to the energy-saving mode is stored. When a continuation time in which the square sum S of the difference values of the accelerations Ax to Az which are output values of the three-axis acceleration sensor 13 is smaller than the power-saving threshold value is longer than the power-saving transition time, the transmitter 1 transitions from the normal mode to the energy-saving mode. Moreover, in the embodiment, "3 minutes" is set as an initial value of the power-saving transition time. As described later, the initial value can be set changeably within a range of "3 to 30 minutes" corresponding to an instruction from the amplification device 30.

A RAM (random access memory) 12 is a memory for rewritably storing various work data, flags, and the like when the CPU 10 executes a program such as the control program 11*a* and the like, and has an acceleration memory 12*a*, a square sum memory 12*b*, a difference value memory 12*c*, and a threshold value coefficient memory 12*d*. The acceleration memory 12*a* is a memory for storing the accelerations Ax to Az output from the three-axis acceleration sensor 13 in a mutually distinguishable manner. In addition, the square sum memory 12*b* is a memory for storing a calculation result of the square sum S of the difference values of the accelerations Ax to Az.

The difference value memory 12*c* is a memory for storing a difference value d between the second greatest acceleration and the third greatest acceleration among absolute values of the three accelerations Ax to Az. Hereinafter, among the absolute values of the accelerations Ax to Az, the accelerations are referred to as "acceleration A1, acceleration A2, acceleration A3" in a descending order of acceleration. The threshold value coefficient memory 12*d* is a memory in which a threshold value coefficient α is stored, the threshold value coefficient α being a coefficient added to any one of the accelerations A1 to A3 when the release threshold value R is calculated. In the embodiment, the release threshold value R is calculated by adding the threshold value coefficient α set corresponding to the deviation between the accelerations A1 to A3 to any of the accelerations A1 to A3.

An input unit 14 is an interface which is connected to the input terminal 1*b* ((b) of FIG. 1) and inputs the signal such as the sound signal or the like from the external device such as the electric guitar 20 or the like. When the electric guitar 20 is connected to the input terminal 1*b*, the sound signal is input from the electric guitar 20 via the input terminal 1*b* to the input unit 14. In addition, the input unit 14 is also configured to be connectable to an output unit 30*d* of the amplification device 30, and in a state when the input unit 14 and the output unit 30*d* are connected, the input unit 14 can rewrite the power-saving threshold value stored in the power-saving threshold value memory 11*b*, the power-saving transition time stored in the power-saving transition time memory 11*c*, and the like corresponding to the instruction from the amplification device 30.

A wireless communication unit 15 is an interface for transmission to and reception from the external device by wireless communication. In the embodiment, the wireless communication unit 15 is wirelessly connected to a receiver 30*a* of the amplification device 30, and the sound signal is transmitted from the transmitter 1 to the amplification device 30. The CPU 10, the flash ROM 11, the RAM 12, the input unit 14, and the wireless communication unit 15 described above are connected to each other via a bus line 16.

The amplification device 30 is a device that amplifies and outputs the input sound signal and is wirelessly connected to the transmitter 1 and the like. The amplifier 30 includes the receiver 30*a* for receiving the sound signal, an amplifier 30*b* for amplifying an analog musical sound generated from the received sound signal, a speaker 30*c* for producing (outputting) the analog musical sound signal amplified by the amplifier 30*b* as a musical sound, and the output unit 30*d* which is an interface for outputting the signal to the external device such as the transmitter 1 or the like. Moreover, when the input unit 14 (the input terminal 1*b*) of the transmitter 1 and the output unit 30*d* of the amplification device 30 are connected, the signal is transmitted from the output unit 30*d* to the input unit 14, power is supplied to the transmitter 1 via the input terminal 1*b*, and the battery B of the transmitter 1 is charged.

Next, with reference to FIG. 3, the main processing executed by the CPU 10 of the transmitter 1 is described. The main processing is executed when the power of the transmitter 1 is turned on and also when the interrupt signal is output from the three-axis acceleration sensor 13 to the CPU 10.

In the main processing, first, a clock counter i is initialized to 0 (S1). In the processing of S5 to S7 described later, the clock counter i is a counter variable for measuring a continuation time in which the square sum S of the difference values of the accelerations Ax to Az is smaller than the power-saving threshold value and comparing the measured result with the power-saving transition time. After the processing of S1, if a sound signal is input from the electric guitar 20 to the input unit 14, the sound signal is transmitted to the amplification device 30 by the wireless communication unit 15 (S2). Thereby, the sound signal based on the playing of the electric guitar 20 is transmitted to the amplification device 30, and the sound signal is amplified and output by the amplification device 30.

After the processing of S2, the accelerations Ax to Az are acquired from the three-axis acceleration sensor 13 and are stored in the acceleration memory 12*a* in a mutually distinguishable manner (S3). Then, a calculation result of the square sum S of the difference values of the previous values and the current values of the accelerations Ax to Az of the acceleration memory 12*a* is stored in the square sum memory 12*b* (S4), and it is confirmed whether the square sum S is smaller than the power-saving threshold value stored in the power-saving threshold value memory 11*b* (S5).

Because the value based on the gravity acceleration is set as the power-saving threshold value as described above, when the square sum S is smaller than the power-saving threshold value, the three-axis acceleration sensor 13 does not detect the accelerations Ax to Az other than the gravity acceleration. That is, it can be determined that the transmitter 1 is in the stationary state (the not-in-use state and the playing stop state of the electric guitar 20).

The playing operation of the electric guitar 20 by the user H includes a wide range of operations from operations with a relatively great vibration performed by the user H such as shaking the electric guitar 20, striking strings and the like to operations with a relatively small vibration such as changing a fret. Even in the case of an operation with a small vibration, the three-axis acceleration sensor 13 detects the gravity acceleration and the acceleration based on the operation with a small vibration, and thus accelerations greater than the gravity acceleration are detected as the accelerations Ax to Az. Then, the square sum S of the difference values of the accelerations Ax to Az becomes equal to or greater than the power-saving threshold value, and thus it can be determined that the transmitter 1 is not in the stationary state, namely the playing state of the electric guitar 20. In this way, the determination of the stationary state (the playing stop state) of the transmitter 1 can be performed using the accelerations Ax to Az and the power-saving threshold value based on the gravity acceleration.

In the processing of S5, when the square sum S is smaller than the power-saving threshold value stored in the power-saving threshold value memory 11*b* (S5: Yes), 1 is added to the clock counter i (S6). Thereafter, it is confirmed whether the clock counter i is greater than the power-saving transition time (S7), and when the clock counter i is greater than the power-saving transition time, that is, when a state in which the square sum S is smaller than the power-saving threshold value continues for 3 minutes (the power-saving transition time) or longer (S7: Yes), release threshold value setting processing (S8) is performed, and thereafter, the CPU 10 is made to sleep (S9), and the transmitter 1 is transitioned to the energy-saving mode. In the energy-saving mode, the execution of the main processing is stopped.

On the other hand, if the clock counter i is equal to or smaller than the power-saving transition time in the processing of S7 (S7: No), the continuation time in which the square sum S is smaller than the power-saving threshold value is short, and in this case, it cannot be determined that the electric guitar 20 is in the not-in-use state. Thus, in this case, the processing is transitioned to S2, and the processing from S2 onward is repeated. In addition, if the square sum S is equal to or greater than the power-saving threshold value stored in the power-saving threshold value memory 11*b* in the processing of S5 (S5: No), it can be determined that some vibration is applied to the transmitter 1 and the electric guitar 20. That is, it can be determined that the electric guitar 20 is in the playing state. Thus, in this case, the processing is transitioned to S1, the value of the clock counter i is cleared to 0, and the processing from S1 onward is repeated.

Next, the release threshold value setting processing (S8) in FIG. 3 is described with reference to FIGS. 4 and 5. The release threshold value setting processing (S8) is processing for calculating, before transitioning to the energy-saving mode, the release threshold value R which is the release condition of the energy-saving mode (S9 in FIG. 3), and setting the release threshold value R to the three-axis acceleration sensor 13.

In the release threshold value setting processing (S8), first, the absolute values of the accelerations Ax to Az stored in the acceleration memory 12*a* are calculated, and accelerations A1 to A3 in a descending order of the accelerations Ax to Az are acquired (S20). Next, the difference value d which is the difference between the acceleration A2 which is the second greatest acceleration and the acceleration A3 which is the third greatest acceleration is calculated and stored in the difference value memory 12*c* (S21). Thereafter, it is confirmed whether the difference between the accelerations A1 and A2 is greater than twice the difference value d (S22). Here, the processing of S22 and the subsequent processing of S23 and S24 are described with reference to (a) of FIG. 5.

(a) of FIG. 5 is a diagram showing a calculation method of the release threshold value R when the deviation between the accelerations A1 to A3 is great. (a) of FIG. 5 illustrates a case in which the acceleration Ax takes the acceleration A1, the acceleration Az takes the acceleration A2, and the acceleration Ay takes the acceleration A3. First, the difference value d between the accelerations A2 and A3 is calculated in the processing of S21. Then, it is determined whether the difference between the accelerations A1 and A2 is greater than twice the difference value d (S22). That is, in the processing of S22, it is determined whether the deviation between the accelerations A1 to A3 is great, and whether the acceleration A1 is significantly greater than the acceleration A2 and the acceleration A3.

Then, if the acceleration A1 is significantly great (S22: Yes), the difference value d is set as the threshold value coefficient α (S23), and a value which is obtained by adding the threshold value coefficient α to the acceleration A2 is set as the release threshold value R in the three-axis acceleration sensor 13 (S24). That is, the CPU 10 stores the release threshold value R in the release threshold value register 13*a* of the three-axis acceleration sensor 13.

Here, the release threshold value setting processing (S8) is executed when it is determined by the processing of S5 to S7 (FIG. 3) that the transmitter 1 is continuously in the stationary state, and thus the accelerations detected by the three-axis acceleration sensor 13 are obtained from the gravity acceleration. Therefore, in the case of (a) of FIG. 5, the X-axis direction that is the acceleration A1 includes many vertical components to which the gravity acceleration is applied.

If the release threshold value R is set based on the acceleration A1 that is greatly affected by the gravity acceleration, even if the electric guitar 20 is lifted vertically, the acceleration Ax never exceeds the release threshold value R if the electric guitar 20 is not lifted with a considerable force. Similarly, even if the electric guitar 20 is horizontally shaken, the accelerations Ay and Az exceed the release threshold value R only when the electric guitar 20 is greatly shaken. That is, if the release threshold value R is set based on a significantly great acceleration A1, "sensitivity" for returning from the energy-saving mode to the normal mode will decrease.

Thus, in the embodiment, the release threshold value R is calculated by adding the threshold value coefficient α to the second greatest acceleration A2. Thereby, when the electric guitar 20 is horizontally shaken, the accelerations Ay and Az exceed the release threshold value R. In addition, when the electric guitar 20 is lifted vertically, the acceleration is applied in a direction opposite to the gravity acceleration, and thus the acceleration Ax changes from the acceleration A1 to an acceleration of 0, and then to a negative acceleration. At this time, the acceleration Ax changes from the state of exceeding the release threshold value R to be equal to or lower than the release threshold value R. Thus, the interrupt signal is output from the three-axis acceleration sensor 13 to the CPU 10 at a timing when the acceleration Ax becomes equal to or lower than the release threshold value R from the state of exceeding the release threshold value R, and the CPU 10 can be returned from the energy-saving mode to the normal mode. That is, even when the electric guitar 20 is shaken horizontally or when the electric guitar 20 is lifted vertically, the CPU 10 can be reliably returned from the energy-saving mode to the normal mode.

In addition, because the threshold value coefficient α is the difference value d between the acceleration A2 and the acceleration A3, the threshold value coefficient α becomes the release threshold value R which takes the deviation between the accelerations A1 to A3 into consideration. Thus, even when the acceleration A1 is significantly great, the release threshold value R can be set under which the sensitivity of returning from the energy-saving mode to the normal mode is good.

Figure 4:
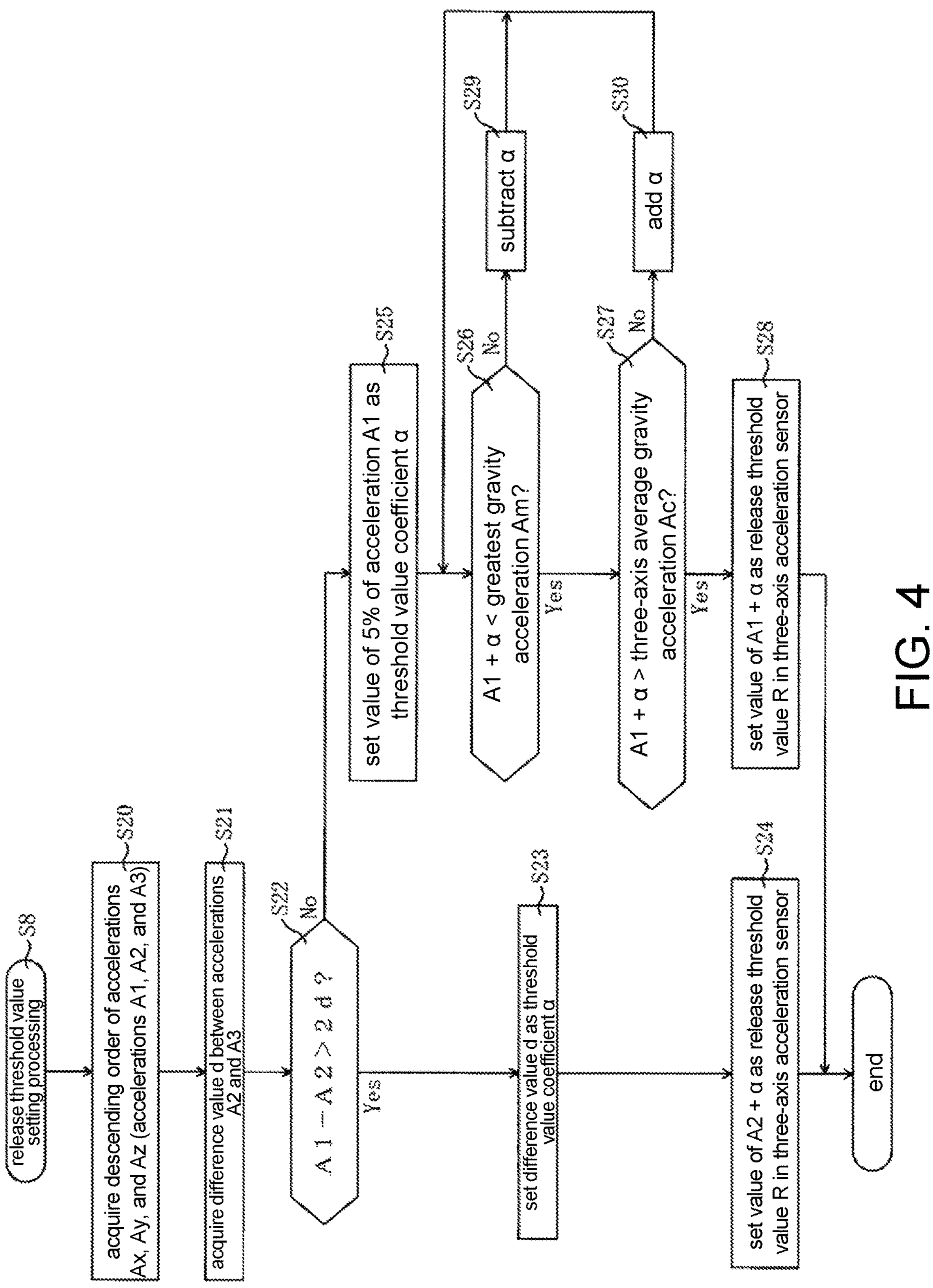
FIG. 4 is a flowchart of release threshold value setting processing.

Back to FIG. 4, in the processing of S22, if the difference between the accelerations A1 and A2 is less than twice the difference value d (S22: No), the deviation between the accelerations A1 to A3 is small, and it can be determined that the acceleration A1 is not a significant value. Thus, in this case, the threshold value coefficient α is set based on the accelerations A1 to A3 of all the three axes. In the embodiment, first, a value of 5% of the acceleration A1 is set as the threshold value coefficient α and stored in the threshold value coefficient memory 12*d* (S25). Here, the processing of S25 and the subsequent processing of S26 to S30 are described with reference to (b) of FIG. 5.

(b) of FIG. 5 is a diagram showing the calculation method of the release threshold value R when the deviation between the accelerations A1 to A3 is small. In (b) of FIG. 5, the acceleration Ax takes the acceleration A1, the acceleration Ay takes the acceleration A2, and the acceleration Az takes the acceleration A3. Besides, in the processing of S22 in FIG. 4, the difference between the accelerations A1 and A2 is determined to be twice the difference value d or less, and the deviation between the accelerations A1 to A3 is small. Thus, because the deviation between the accelerations A1 to A3 is small, unlike the case described above in (a) of FIG. 5 in which the deviation between the accelerations A1 to A3 is great, the release threshold value R is determined based on all of the accelerations A1 to A3. In the embodiment, first, the value of 5% of the acceleration A1 is set as the threshold value coefficient α (S25 in FIG. 4).

Here, the threshold value coefficient α is the value of 5% of the acceleration A1, and the release threshold value R is a value obtained by adding the acceleration A1 and the threshold value coefficient α, and thus the release threshold value R may be set too great. In this case, the sensitivity of returning from the energy-saving mode to the normal mode deteriorates. Conversely, when the release threshold value R is set too small, the return sensitivity also deteriorates.

Thus, in the embodiment, in order to prevent the release threshold value R from being set too great or too small, an upper limit of the release threshold value R is set to be the greatest gravity acceleration Am which is the acceleration when the gravity acceleration is applied to one of the X-axis, the Y-axis, and the Z-axis. On the other hand, a lower limit of the release threshold value R is set to be a three-axis average gravity acceleration Ac which is the acceleration when the gravity acceleration is evenly applied to the X-axis, the Y-axis, and the Z-axis. Thereby, at least the three-axis average gravity acceleration Ac is set as the release threshold value R, and thus the return sensitivity from the energy-saving mode to the normal mode can be set favorably.

That is, in the embodiment, the greatest gravity acceleration Am is set to "9.8 $m/s^2$" which is the acceleration when the gravity acceleration is applied to any one of the X-axis, the Y-axis, and the Z-axis, and the three-axis average gravity acceleration Ac is set to "3.3 $m/s^2$" which is the acceleration when the gravity acceleration is evenly divided into three to the X-axis, the Y-axis, and the Z-axis.

In FIG. 4, after the processing of S25, it is confirmed whether the result of adding the acceleration A1 and the threshold value coefficient α is smaller than the greatest gravity acceleration Am (S26). If the addition result of the acceleration A1 and the threshold value coefficient α is equal to or greater than the greatest gravity acceleration Am (S26: No), the addition result is too great as the release threshold value R. Thus, in this case, a value of 10% of the threshold value coefficient α is subtracted from the threshold value coefficient α (S29), and the processing of S26 is repeated.

On the other hand, if the result of adding the acceleration A1 and the threshold value coefficient α is smaller than the greatest gravity acceleration Am in the processing of S26 (S26: Yes), it is further confirmed whether the addition result is greater than the three-axis average gravity acceleration Ac (S27). If the addition result of the acceleration A1 and the threshold value coefficient α is equal to or smaller than the three-axis average gravity acceleration Ac (S27: No), the addition result is too small as the release threshold value R. Thus, in this case, a value of 10% of the threshold value coefficient α is added to the threshold value coefficient α (S30), and the processing of S27 is repeated.

If the addition result of the acceleration A1 and the threshold value coefficient α is greater than the three-axis average gravity acceleration Ac in the processing of S27 (S27: Yes), the addition result of the acceleration A1 and the threshold value coefficient α to be set as the release threshold value R is set between the three-axis average gravity acceleration Ac and the greatest gravity acceleration Am as shown in (b) of FIG. 5. Thus, the addition result is set as the release threshold value R in the three-axis acceleration sensor 13 (S28). The three-axis acceleration sensor 13 stores the release threshold value R set by the CPU 10 into the release threshold value register 13*a*. In this way, even when the deviation between the accelerations A1 to A3 is small, the release threshold value R under which the return sensitivity from the energy-saving mode to the normal mode is good can be set based on the acceleration A1.

After the processing of S24 and S28 in FIG. 4, the release threshold value setting processing (S8) is terminated, the processing returns to the main processing in FIG. 3, the CPU 10 is made to sleep (S9) to transition to the energy-saving mode. During the energy-saving mode, when any one of the accelerations Ax to Az detected by the three-axis acceleration sensor 13 becomes equal to or greater than the release threshold value R from the state of being smaller than the release threshold value R or becomes equal to or smaller than the release threshold value R from the state of being greater than the release threshold value R, an interrupt signal is output from the three-axis acceleration sensor 13 to the CPU 10. When the interrupt signal is input, the CPU 10 returns from the sleep state (the energy-saving mode) to the normal mode and executes the main processing (FIG. 3) from the processing of S1.

In this way, the release threshold value R is calculated based on the accelerations A1 to A3 in the stationary state of the transmitter 1 and the deviation between the accelerations A1 to A3 right before transitioning to the energy-saving mode, and thus the transmitter 1 can be accurately returned from the energy-saving mode to the normal mode according to the change in the acceleration after transitioning to the energy-saving mode.

As described above, the transmitter 1 in the embodiment is determined to be in the stationary state when the square sum S of the difference values of the accelerations Ax to Az detected by the three-axis acceleration sensor 13 is smaller than the power-saving threshold value based on the gravity acceleration in the normal mode of the transmitter 1, and when the duration of the stationary state exceeds the power-saving transition time, the electric guitar 20 is determined to be in the not-in-use state, and the transmitter 1 is transitioned to the energy-saving mode. In this way, the stationary state of the transmitter 1 and the not-in-use state of the electric guitar 20 can be accurately detected based on the accelerations Ax to Az, and the transition to the energy-saving mode can be performed accurately.

In addition, when the accelerations Ax to Az detected in the energy-saving mode become equal to or greater than the release threshold value R from a state of being smaller than the release threshold value R or become equal to or smaller than the release threshold value R from a state of being greater than the release threshold value R, the transmitter 1 is returned from the energy-saving mode to the normal mode. Here, the release threshold value R is calculated based on the accelerations A1 to A3 in the stationary state of the transmitter 1 and the deviation between the accelerations A1 to A3 right before transitioning to the energy-saving mode, and thus the transmitter 1 can be accurately returned from the energy-saving mode to the normal mode according to the change in the acceleration after transitioning to the energy-saving mode.

In the above, the present invention is described based on the above embodiment, but the present invention is not limited to the above embodiment, and it can be easily inferred that various improvements and modifications can be made without departing from the spirit of the present invention.

In the above embodiment, the portable shoulder-mounted electric guitar 20 is described as an example of the electronic musical instrument. However, the present invention is not necessarily limited hereto, and any electronic musical instrument such as a shoulder-mounted electric bass, a shoulder-mounted electronic keyboard, an electronic saxophone (an electronic wind instrument) or the like which is held and played by the user H and which is connected to the amplification device 30 by wireless communication may be appropriately applied. In addition, although the three-axis acceleration sensor 13 is described as an example of the acceleration sensor, a one-axis acceleration sensor or a two-axis acceleration sensor may be used.

In the processing of S5 (FIG. 3), the stationary state of the transmitter 1 is determined by comparing the power-saving threshold value and the square sum S of the difference values of the accelerations Ax to Az. However, instead of this, the stationary state of the transmitter 1 may be determined by comparing the power-saving threshold value and the sum of the accelerations Ax to Az, or the stationary state of the transmitter 1 may be determined by comparing the product or the average value of the accelerations Ax to Az. Moreover, in these cases, the power-saving threshold value is set according to the sum, the product or the average value of the accelerations Ax to Az.

In the processing of S21 and S22 (FIG. 4), the difference value d between the accelerations A2 and A3 is used as a value for determining the deviation between the accelerations A1 to A3, and in the processing of S23, the difference value d is used as the threshold value coefficient α. However, instead of this difference value d, a constant calculated based on an actual in-use state of the electric guitar 20 may be stored in the flash ROM 11 and the like, and the deviation between the accelerations A1 to A3 may be determined by the constant or the constant may be used as the threshold value coefficient α. In addition, the deviation between the accelerations A1 to A3 may be determined using a value which is half of the difference value between the accelerations A1 and A2, or this value may be used as the threshold value coefficient α. Furthermore, a constant corresponding to the difference between the acceleration A1 and the acceleration A2 calculated based on the actual in-use state of the electric guitar 20 may be stored in the flash ROM 11 or the like, and the deviation between the accelerations A1 to A3 may be determined by the constant or the constant may be used as the threshold value coefficient α.

In the processing of S21 to S25 (FIG. 4), when the deviation between the accelerations A1 to A3 is small, a value of 5% of the acceleration A1 is set as the threshold value coefficient α. However, instead of this, a value of 5% of the acceleration A2 or the acceleration A3 may be set as the threshold value coefficient α, or a value of 5% of the average value of the accelerations A1 to A3 may be set as the threshold value coefficient α. Furthermore, a value calculated in advance based on an actual in-use state of the electronic musical instrument (for example, the electric guitar 20) may be stored in the flash ROM 11 or the like and the value may be used as the threshold value coefficient α.

The transition to the energy-saving mode and the return to the normal mode are performed only by the transmitter 1. However, the present invention is not necessarily limited hereto, and when the transmitter 1 is transitioned to the energy-saving mode or returned to the normal mode, the transition signal or the return signal may be transmitted to the electronic musical instrument (for example, the electric guitar 20) on which the amplification device 30 and the transmitter 1 are mounted, and the transition to the energy-saving mode or the return to the normal mode may be executed in the amplification device 30 or the like that has received the signal.

It is obvious that the numerical values put forth in the above embodiment are examples and other numerical values can be employed.

What is claimed is:

1. A transmitter for musical instrument which transmits a sound signal emitted from a musical instrument to an outside using a battery arranged inside a main body of the transmitter, wherein the transmitter for musical instrument has a first mode and a second mode in which power consumption of the battery is smaller than the first mode, and the transmitter for musical instrument comprises:

a detection part for detecting an acceleration of the main body;

a switching part for transitioning to the second mode when a detection value of the detection part shows a value within a predetermined range during a predetermined time in the first mode;

a release part for releasing the second mode to transition to the first mode when the detection value of the detection part exceeds a release threshold value in the second mode; and a release threshold value setting part for setting the release threshold value based on the detection value of the detection part at a time of transition from the first mode to the second mode;

wherein the detection part comprises a three-axis acceleration sensor, and the release threshold value setting part sets the release threshold value based on a second greatest detection value and a third greatest detection value among detection values of the three-axis acceleration sensor.

2. A transmitter for musical instrument which transmits a sound signal emitted from a musical instrument to an outside using a battery arranged inside a main body of the transmitter, wherein the transmitter for musical instrument has a first mode and a second mode in which power consumption of the battery is smaller than the first mode, and the transmitter for musical instrument comprises:

a detection part for detecting an acceleration of the main body;

a switching part for transitioning to the second mode when a detection value of the detection part shows a value within a predetermined range during a predetermined time in the first mode;

a release part for releasing the second mode to transition to the first mode when the detection value of the detection part exceeds a release threshold value in the second mode; and a release threshold value setting part for setting the release threshold value based on the detection value of the detection part at a time of transition from the first mode to the second mode;

wherein the detection part comprises a three-axis acceleration sensor, the release threshold value setting part sets the release threshold value based on all detection values of the three-axis acceleration sensor, and the release threshold value is set to be equal to or greater than an average gravity acceleration when a gravity acceleration is evenly applied to three axes and be equal to or smaller than a greatest gravity acceleration when the gravity acceleration is applied to one of the three axes.

3. A mode switching method for performing, in a transmitter for musical instrument which transmits a sound signal emitted from a musical instrument to an outside using a battery arranged inside a main body of the transmitter, switching from a first mode to a second mode in which power consumption of the battery is smaller than the first mode, the mode switching method comprising:

a detection step for detecting an acceleration of the main body in the first mode, and a switching step for transitioning to the second mode when the detection value detected by the detection step shows a value within a predetermined range during a predetermined time;

wherein the mode switching method further comprises:

releasing the second mode to transition to the first mode when the detection value of the acceleration detected in the detection step exceeds a release threshold value in the second mode; and a release threshold value setting step for setting the release threshold value based on the detection value of the acceleration detected in the detection step at a time of transition from the first mode to the second mode;

wherein the detection step detecting three axis accelerations of the main body, and the release threshold value setting step setting the release threshold value based on a second greatest detection value and a third greatest detection value among detection values of the three axis accelerations.

4. A mode switching method for performing, in a transmitter for musical instrument which transmits a sound signal emitted from a musical instrument to an outside using a battery arranged inside a main body of the transmitter, switching from a first mode to a second mode in which power consumption of the battery is smaller than the first mode, the mode switching method comprising:

a detection step for detecting an acceleration of the main body in the first mode, and a switching step for transitioning to the second mode when the detection value detected by the detection step shows a value within a predetermined range during a predetermined time;

wherein the mode switching method further comprises:

releasing the second mode to transition to the first mode when the detection value of the acceleration detected in the detection step exceeds a release threshold value in the second mode; and a release threshold value setting step for setting the release threshold value based on the detection value of the acceleration detected in the detection step at a time of transition from the first mode to the second mode;

wherein the detection step detecting three axis accelerations of the main body, and the release threshold value setting step setting the release threshold value based on all detection values of the three axis accelerations, and the release threshold value is set to be equal to or greater than an average gravity acceleration when a gravity acceleration is evenly applied to three axes and be equal to or smaller than a greatest gravity acceleration when the gravity acceleration is applied to one of the three axes.

5. A mode switching method for performing, in a transmitter for musical instrument which transmits a sound signal emitted from a musical instrument to an outside using a battery arranged inside a main body of the transmitter, switching from a second mode to a first mode in which power consumption of the battery is greater than the second mode, the mode switching method comprising:

a detection step for detecting an acceleration of the main body in the second mode;

a release step for releasing the second mode to transition to the first mode when the detection value of the detection step exceeds a release threshold value; and a release threshold value setting step for setting the release threshold value based on the detection value of the acceleration detected in the detection step at a time of transition from the first mode to the second mode;

wherein the detection step detecting three axis accelerations of the main body, and the release threshold value setting step setting the release threshold value based on a second greatest detection value and a third greatest detection value among detection values of the three axis accelerations.

6. A mode switching method for performing, in a transmitter for musical instrument which transmits a sound signal emitted from a musical instrument to an outside using a battery arranged inside a main body of the transmitter, switching from a second mode to a first mode in which power consumption of the battery is greater than the second mode, the mode switching method comprising:

a detection step for detecting an acceleration of the main body in the second mode;

a release step for releasing the second mode to transition to the first mode when the detection value of the detection step exceeds a release threshold value; and a release threshold value setting step for setting the release threshold value based on the detection value of the acceleration detected in the detection step at a time of transition from the first mode to the second mode;

wherein the detection step detecting three axis accelerations of the main body, and the release threshold value setting step setting the release threshold value based on all detection values of the three axis accelerations, and the release threshold value is set to be equal to or greater than an average gravity acceleration when a gravity acceleration is evenly applied to three axes and be equal to or smaller than a greatest gravity acceleration when the gravity acceleration is applied to one of the three axes.

* * * * *